US007326359B2

(12) United States Patent
Heylbroeck et al.

(10) Patent No.: US 7,326,359 B2
(45) Date of Patent: Feb. 5, 2008

(54) IN-LINE DEMETALLIZATION PROCESS FOR FLEXIBLE METALLIZED SUBSTRATES

(75) Inventors: Henk Heylbroeck, Ghent (BE); Mark Vints, Ghent (BE)

(73) Assignee: Amcor Flexibles Europe A/S (DK)

( * ) Notice: Subject to any disclaimer, the term of this patent is extended or adjusted under 35 U.S.C. 154(b) by 303 days.

(21) Appl. No.: 10/521,915

(22) PCT Filed: May 22, 2003

(86) PCT No.: PCT/BE03/00090

§ 371 (c)(1),
(2), (4) Date: Jan. 20, 2005

(87) PCT Pub. No.: WO2004/009872

PCT Pub. Date: Jan. 29, 2004

(65) Prior Publication Data

US 2005/0269025 A1 Dec. 8, 2005

(30) Foreign Application Priority Data

Jul. 22, 2002 (EP) .................................. 02447139

(51) Int. Cl.

| | |
|---|---|
| ***B44C 1/22*** | (2006.01) |
| ***C03C 15/00*** | (2006.01) |
| ***C03C 25/68*** | (2006.01) |
| ***C23F 1/00*** | (2006.01) |

(52) U.S. Cl. ........................................................ 216/91

(58) Field of Classification Search .................. 216/91
See application file for complete search history.

(56) References Cited

U.S. PATENT DOCUMENTS

| | | | |
|---|---|---|---|
| 3,647,508 | A | 3/1972 | Gorrell |
| 4,959,120 | A | 9/1990 | Wilson |
| 5,628,921 | A | 5/1997 | Beckett |
| 5,759,422 | A | 6/1998 | Schmelzer et al. |
| 2002/0045351 | A1 | 4/2002 | Jo |

*Primary Examiner*—Roberts Culbert
(74) *Attorney, Agent, or Firm*—McDonnell Boehnen Hulbert & Berghoff LLP

(57) ABSTRACT

The present invention discloses a continuos process for the partial demetallization of a first multilayer substrate, comprising at least one metallic layer 21, characterized in that a designed lacquer comprising at least one metal dissolving etchant 25 locally reacts with said metallic layer 21 and that the dissolved metal remains within said multilayer structure and that the dissolution of the metal allows the creation of a window in said metallic layer without the necessity of a washing step and in that said partial demetallization is suitable to be carried out on standard gravure or flexo printing presses or coating equipment.

18 Claims, 1 Drawing Sheet

IN-LINE DEMETALLIZATION PROCESS FOR FLEXIBLE METALLIZED SUBSTRATES

FIELD OF THE INVENTION

The present invention is related to the field of metallized packaging substrate needing a partially demetallized area and more particularly to a simplified process for obtaining the same.

TECHNOLOGICAL BACKGROUND

In flexible packaging applications, polymeric films and/or paper webs are often combined to a metallic layer generally consisting of aluminium. This metallic layer can be a self-supporting foil, typically between 6 and 15 μm thick, or it can be a much thinner layer, generally below 0,1 μm thick, on a polymeric or paper support. This metallic layer is usually applied by a vacuum coating process, in which vaporised metal atoms adhere to a suitable substrate. This vacuum metallization process is extensively described in the literature.

Metal foils and metallic coatings have several functions, including barrier functions with regard to atmospheric gases, water vapour, radiation, etc. and, in addition, play an important role in the marketing aspects of a package. Such metallic layers give a particular brilliance and colour intensity to the overlying printed design, and, where visible by themselves as a metallic design element, give a perception of quality and protection of the package contents. In many cases though, when the barrier needs of the package allow it, the producer would wish to combine these positive marketing aspects of a metallic layer with a partial window in the metallic layer. In the case of transparent polymeric films the main purpose would be to allow for visual inspection of the packaged product by the consumer in the retail phase. In the case of multilayer structures involving paper or other non-transparent substrates, there might be other functional or marketing advantages in having a partial window in the metallic layer.

In most of the following, we focus on the case of transparent polymeric film laminates with thin metallic coatings as being the most important class of multilayer materials in which the current invention could be applied. Here the current industrial practice for obtaining a partial demetallization has been a procedure involving the following processing steps:

a) a printing step, involving a metallized film, typically consisting of an oriented coextruded polypropylene film, between 15 and 30 μm thick and vacuum coated with a layer of aluminium, about 100 to 1000 Å thick, which is partially printed on a regular printing line (typically a gravure or flexo press) using a suitable ink system and an overlacquer to protect the inks during subsequent processing. In most cases, a primer is applied between the metallized layer and the printing inks to improve adhesion. When this printed film is intended for partial demetallization, care is taken that neither primers nor inks or overlacquers cover the aluminium in the area to be demetallized. In the case that an unprinted metallized film is intended to be partially demetallized, only the protective overlacquer would need to be printed, possibly with the addition of a suitable primer;
b) a demetallization step, involving the passage of the film prepared according to step (a) through a concentrated sodium hydroxide (NaOH) solution in water, whereby the exposed portions of the metallic aluminium are dissolved and the dissolved metal is subsequently washed away with water, followed by a drying operation to remove excess moisture;
c) a lamination step, whereby the printed demetallized film is taken on a laminating machine and bonded to another self-supporting film web, typically 15-30 μm thick, using a suitable adhesive system (most often a two-component polyurethane adhesive).

The procedure described above and in practical use today is seen to involve at least three separate converting steps, which makes it a very costly process, limiting its market penetration to high-end products. A further disadvantage is the time loss because of the logistics of the three-step process, especially if converting and demetallization equipment are found in different production sites. A further disadvantage is the fact that particular in-line operations, such as the application of a cold seal lacquer on the backside of the metallized film, become impossible because of the various processing steps. A further disadvantage is the lack of an optimal quality control in the printing step, since the final result only becomes visible after the demetallization step.

State of the Art

The above multi-step procedure being the current industrial practice, we believe that the following documents represent the closest prior art.

U.S. Pat. No. 5,628,921 describes a process for carrying out the classical demetallization involving a caustic solution and a washing step, in-line with a gravure printing operation, through the use of a dedicated machinery custom made for this purpose and essentially consisting of a classical demetallization equipment connected to a classical gravure printing press. It would seem that this process and equipment has the advantageous possibility of in-line quality control checking the demetallized area in respect of the printed design, this is however achieved at the expense of a much higher investment cost for this complicated machinery.

U.S. Pat. No. 3,647,508 discloses a process for carrying out the demetallization whereby the etching agent is mixed with a film-forming dispersion thereby achieving that the etching agent can be contained within a dried coating remaining on the web. However this method only claims particular effects on the conductivity, reflectivity and adhesion of the final product, not transparency, and an optional washing step is described evidently for this purpose.

The purpose of the present invention is to obtain clarity and transparency (high transmission and clarity and low haze) of the demetallized window, which still requires a washing step in the prior art.

In summary, neither of the two described processes constitutes a significant breakthrough versus the current practice described in the technological background.

Aims of the Invention

The present invention aims to provide a simplified process for partial demetallization of flexible substrates, performed on standard equipment such as a gravure or flexo press, rather than on machinery specifically designed for demetallization. Furthermore, this invention aims to reduce complexity and cost of the entire process by performing said process in-line with other converting operations such as printing, laminating and/or coating in one continuous operation.

SHORT DESCRIPTION OF THE DRAWINGS

SUMMARY OF THE INVENTION

Figure 1:
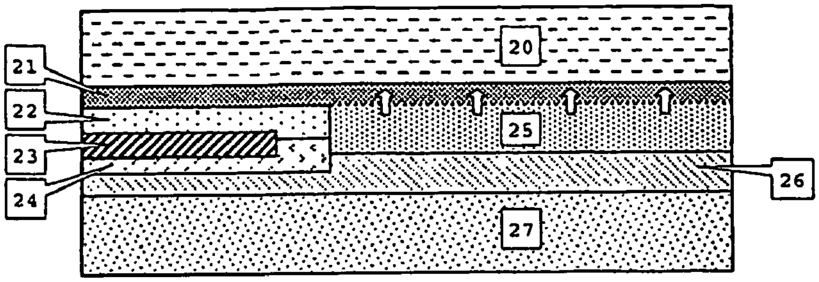
FIG. 1 represents a metallized film complex comprising different components according to a first embodiment of the present invention.

The present invention discloses a continuous process for the partial demetallization of a first multilayer substrate, comprising at least one metallic layer, characterised in that a designed lacquer comprising at least one metal dissolving etchant, locally reacts with said metallic layer and that the dissolved metal remains within said multilayer structure and that the dissolution of the metal allows the creation of a window in said metallic layer without the necessity of a washing step and in that said partial demetallization is suitable to be carried out on standard gravure or flexo printing presses or coating equipment.

A possible embodiment of the present invention is that said process further comprises a lamination step of the partly demetallized multilayer support with at least one second substrate.

Furthermore, the present invention discloses that at least one of said substrates is selected from the group consisting of polymeric films, paper, metallic foils and non-woven substrates.

Another possible embodiment is that at least one of said substrates is treated by at least one coating operation and/or at least one printing operation.

The present invention also shows that said coating or printing operation is carried out on a different substrate surface than that where the demetallization is carried out, yet involves a patterned print or coating in register with the demetallized area and/or the other printed designs in or on the multilayer structure.

Another key feature of the present invention is that the demetallization step achieves a light transmission of at least 90% within the demetallized area without a washing step.

Furthermore, the demetallization step to obtain a light transmission of at least 90% is carried out on standard gravure or flexo printing presses or coating equipment without necessitating specific dedicated equipment for demetallization.

Another key feature of the present invention is that the etchant concentration in the etchant lacquer substantially corresponds to the stoechiometrical amount of said etchant to dissolve the amount of metal present on the film.

Alternatively, the etchant concentration in the etchant lacquer corresponds to a slight excess of the stoechiometrical amount of said etchant to dissolve the amount of metal present on the film.

Finally, the present invention discloses a multilayer support obtainable by any of the previous claims comprising windows in continuous and/or discontinuous supported metallic layers characterised in that said windows contain the total quantity of the residues resulting from the demetallization by means of an etching product.

DETAILED DESCRIPTION OF THE INVENTION

The present invention discloses a process for partial demetallization, whereby the etching agent is contained in a suitable formulated lacquer which can be applied onto the metallized web using commonly available film converting equipment (such as a gravure or flexo press or coating line) and said lacquer is designed to remain in contact with the web, thereby also retaining the dissolved metal in place, such that the need for washing and drying the demetallized part of the web is eliminated while simultaneously achieving optimal clarity and transparency of the demetallized area.

The following measurements have been achieved on a suitable equipment specified hereunder to show the high transparency reached on samples realised according to the process of the present invention:

Equipment: Haze-Gard plus

Measurement: according to norm ASTM-1003

Results:

(a) on a demetallized laminate:
- transmission=94.1%±1.2%
- haze=4.7%±0.6%
- clarity=96.1%±0.4%

(b) on a transparent laminate:
- transmission=94.9±1.0%
- haze=3.7±0.3%
- clarity=96.2±0.3%

The results show that only negligible differences exist between the demetallized samples and ordinary transparent laminates.

The process achieves the demonstrated transparency by a combination of two actions, the first being the elimination of chemical reactivity of the etchant versus the adhesive layer it contacts in the region of the transparent window, by fine-tuning the amount of etchant lacquer applied onto the metallization through choosing a suitable gravure cylinder depth and adapting the etchant concentration in the wet etchant lacquer as needed, thereby being close to (and only slightly towards excess of) the stoechiometrical amount of etchant needed to completely dissolve the amount of metal present on the film; and a second action being the elimination of any chemical reactivity of the etchant towards the same adhesive which could result from an interaction on the machine between the etchant lacquer and the wet adhesive which would be expected to result in a partial dissolving of the etchant lacquer into the adhesive-containing vessel on the laminating section, at which time the etchant is seen to chemically react with the adhesive.

This invention by itself means a major simplification and cost saving of the demetallization step, since it can now be performed on commonly available equipment rather than on machinery specifically designed for demetallization. Furthermore, this invention immediately gives rise to a further significant reduction in complexity and cost of the entire process, since the demetallization step can easily be performed in-line with other converting operations such as printing and laminating, in one continuous operation. This has the added advantage of allowing immediate control of the demetallized result such that an adjustment in an earlier process step (e.g. the printing position of the protective overlacquer) can be easily made.

A further advantage is the possibility of carrying out particular operations or applying particular products which previously could not withstand the step of demetallization/washing/drying, or were impossible because the lack of registration between the printed design and this additional product, an example being the application of a lacquer on the outside of the laminate in a fixed position with regard to the printed design.

Description of a Preferred Embodiment of the Invention

In the first embodiment of the present invention, as represented in FIG. 1, the metallized substrate 20 as defined above, is partially printed using a suitable ink system 23, typically with the aid of a primer 22 to improve ink adhesion on the metallization 21, and a protective overlacquer 24 on the printed areas. The demetallization in the unprotected areas is achieved by applying a demetallization lacquer 25 containing the etching agent onto the remaining exposed surface of the metallization. This is done in-line with the printing step, and can on suitable printing presses be followed by an in-line laminating step using a suitable laminating adhesive 26 as above. When using solvent-based adhesives it will be advantageous to apply the adhesive to the non-printed web so that the wet adhesive 26 and the solvents contained therein cannot affect the printing inks 23 and especially the demetallization lacquer 25.

Figure 2:
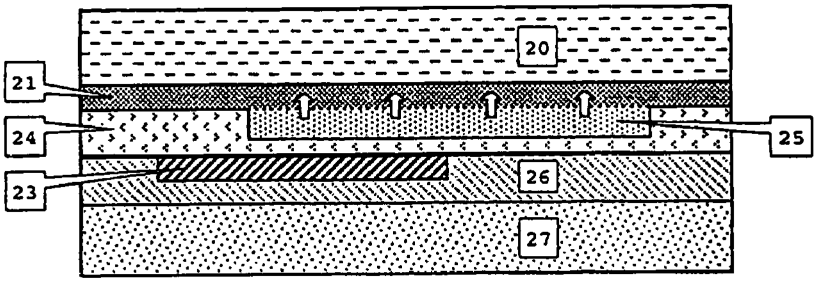
FIG. 2 represents a metallized film complex comprising different components according to a second embodiment of the present invention.

In a second embodiment of the present invention, represented in FIG. 2, the process could be set up so that first the demetallization lacquer 25 is locally printed on the metallized layer, followed by an all-over coated protective lacquer 24, now also covering the demetallization lacquer, and then by the printing inks 23 where intended. Again the finalisation of the laminating step can be done in-line. This alternative procedure would have the added benefit of allowing, for marketing reasons, part of the printed design not be backed by the metallic layer, thereby giving a distinctive change in appearance.

Figure 3:
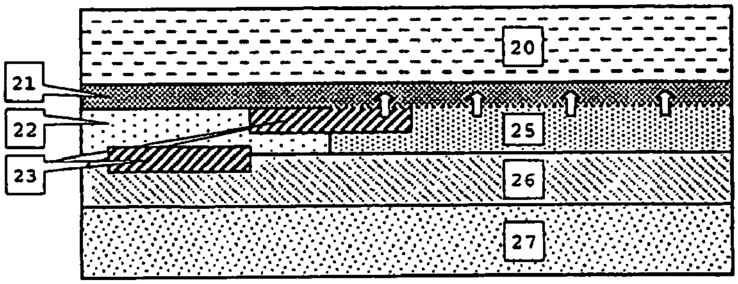
FIG. 3 represents a metallized film complex comprising different components according to a third embodiment of the present invention.
Figure 4:
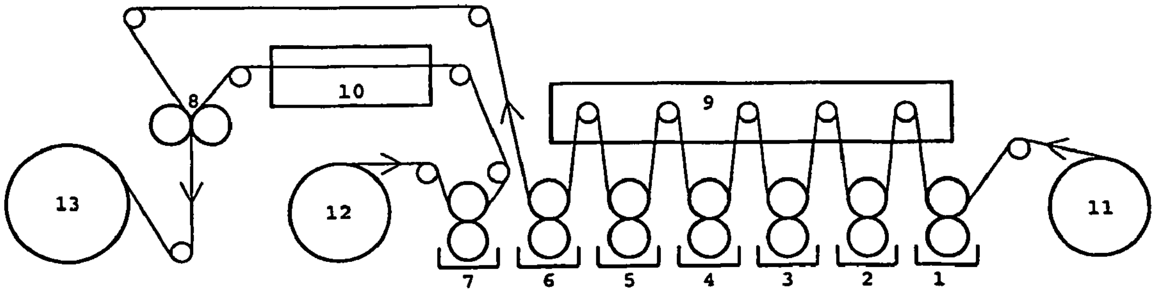
FIG. 4 represents a standard process machinery able to achieve demetallized film according to anyone of the embodiments of the present invention.

In a third embodiment of the present invention represented in FIG. 3, an ink type 23 is used which resists (is not chemically affected by) the etchant 25, but is not a barrier to it, together with a metallization primer 22 which is a barrier to said etchant. In this embodiment the protective overlacquer 24 is not needed. As in the second embodiment, this one allows inks to be backed by metal or by transparent film, and achieves this extra capability even while requiring less gravure positions. If required, other converting operations remain possible in-line.

While the invention has been illustrated and described in what are considered to be the most practical and preferred embodiments, it will be recognised that many variations are possible on the positioning of the different layers and come within the spirit and scope thereof, the appended claims therefore being entitled to a full range of equivalents (inks can be omitted, coatings added, and generally several possible positions are possible for each component of the multilayer structure). Known possibilities, which are also not further explored here, include making a partially demetallized multilayer structure containing only one self-supporting substrate, or alternatively three or more of such substrates, as well as having a metallization layer 21 not directly supported by a substrate but rather applied onto a coating and/or printing ink. Furthermore, completely similar multilayer structures can be made using paper and/or pigmented films, either metallized or not, in such multilayer structures in which case no transparency of the total structure is achieved, but the optical clarity of the demetallized layer itself might be just as appreciated.

Example of a Demetallization Process According to the First Embodiment of the Present Invention During the process, a reel of polymeric film 20, typically consisting of biaxially oriented polypropylene and metallized on one side with a layer of vacuum deposited aluminium 21, is placed in the unwind position 11 of a heliogravure press with in-line laminating capability. The film runs through consecutive gravure printing stations 1 to 6 of the machine, and undergoes the following consecutive operations:

a) in gravure station 1 the entire portion of the metallization layer 21 which is intended to remain on the final material, is coated with an adhesion-promoting primer 22, b) in stations 2, 3 and 4 the individual colours of the printing design 23 are printed on the film, c) in station 5 the printed area 23 is covered by a protective overcoating 24, d) in station 6 the remaining portions of uncovered metallization 21 are covered with the demetallization lacquer 25. As the intended chemical reaction takes place, the part of the metallized layer 21 in contact with the demetallization lacquer 25 becomes transparent. From unwind position 12, a second reel of film 27 is unwound, typically consisting of a transparent biaxially oriented polypropylene, and passes through gravure station 7 in which a layer of adhesive 26 is applied to the inside surface of the film, after that, the adhesive-coated web passes through a drying oven 10 in order to dry the adhesive, before being joined in the laminating nip 8 to the other web (the partially printed, partially demetallized film) thereby making the final laminate which is wound up in position 13.

Example of Demetallization Lacquer

The demetallization lacquer is generally a hard base such as NaOH or KOH dissolved in water or any other possible etching agent combined with a film forming dispersion agent, also called encapsulating agent, such as nitro-cellulose encapsulating said hard base. The compatibility between the etchant and dispersion agent is determinant. Other possible additives are usual processing additives such as anti foaming agents.

A series of demetallization lacquers are given in U.S. Pat. No. 3,647,508 and can be adapted to the process of the present invention.

In summary, this invention has the following innovative aspects and advantages:

- the process achieves optimal clarity and transparency of the demetallized area while eliminating the need for a washing step previously considered necessary for such effect even when using a demetallization lacquer designed to hold both the active agent and its reaction product locked inside the multilayer structure.
- printing, demetallization and laminating can be done in-line on commonly available converting equipment, eliminating the need for a dedicated demetallization line.
- the in-line process, besides being much more efficient and cost-effective, allows for more adequate quality control on the final product allowing for adjustments in each of the previous steps to be implemented immediately.
- this process allows for in-line coating on the outside of the laminate, e.g. a coldseal lacquer, in register with the printed design.

Nomenclature

| | |
|---|---|
| 1-6: | gravure stations |
| 7: | adhesive-coating station |
| 8: | laminating nip |
| 9: | gravure drying oven |
| 10: | adhesive drying oven |
| 11: | unwind film 1 |

-continued

| | |
|---|---|
| 12: | unwind film 2 |
| 13: | rewind laminate |
| 20: | film substrate layer 1 |
| 21: | metallic layer |
| 22: | primer |
| 23: | printing ink |
| 24: | protective overlacquer |
| 25: | demetallization lacquer |
| 26: | laminating adhesive |
| 27: | film substrate layer 2 |

The invention claimed is:

1. A process for the partial demetallization of a multilayer laminate comprising a first film and a second film wherein the first film comprises a first polymeric layer and a metallic layer and the second film comprises a second polymeric layer and an adhesive layer, the process comprising applying an etchant lacquer to the metallic layer of the first polymeric film, applying an adhesive layer to the second polymeric film, and joining the first film and the second film wherein the adhesive layer of the second film contacts the partially demetallized layer of the first film, wherein the lamination step is in-line with the demetallization step, wherein the etchant lacquer comprises at least one metal dissolving etchant on the metallic layer in a quantity of about the stoichiometrical amount needed to dissolve the metallic layer and to eliminate any chemical reactivity of the at least one etchant towards the adhesive layer, wherein the dissolved metal remains within the multilayer laminate, and the dissolution of the metal creates a substantially transparent window in the metallic layer in a washing-free step.

2. The process of claim 1, wherein the process is carried out on standard gravure or flexo printing presses or coating equipment.

3. The process of claim 1, further comprising a coating operation for treating the first film.

4. The process of claim 1, further comprising a printing operation for treating the first film.

5. The process of claim 1, further comprising a coating operation and a printing operation for treating the first film.

6. The process of claim 3, wherein the coating operation comprising a coating in register with the demetallized area on a surface of the first polymeric layer that is different than where the demetallization is carried out.

7. The process of claim 4, wherein the printing operation comprises a patterned print in register with the demetallized area on a surface of the first polymeric layer that is different than where the demetallization is carried out.

8. The process of claim 2, wherein the amount the etchant lacquer is fine-tuned by choosing a suitable gravure cylinder depth.

9. The process of claim 1, wherein the amount the etchant lacquer is fine-tuned by adapting the concentration of the at least one etchant.

10. The process of claim 2, wherein the amount of the etchant lacquer is fine-tuned by choosing a suitable gravure cylinder depth and by adapting the concentration of the at least one etchant.

11. The process of claim 1, wherein the demetallization step achieves a light transmission of at least 90% within the demetallized area.

12. The process of claim 1, wherein the concentration of the at least one etchant corresponds to a slight excess of the stoichiometrical amount needed to dissolve the amount of metal present on the multilayer laminate.

13. A multilayer laminate obtainable by the process of claim 1, comprising a window in a supported metallic layer wherein the window has the total quantity of a residue resulting from the demetallization by means of the etchant lacquer.

14. The process of claim 1 wherein the first polymeric layer is biaxially oriented polypropylene.

15. The process of claim 1 wherein the second polymeric layer is biaxially oriented polypropylene.

16. The process according to claim 1 wherein the first polymeric layer is biaxially oriented polypropylene and the second polymeric layer is biaxially oriented polypropylene.

17. The process according to claim 1 wherein the metallic layer is aluminum.

18. The process according to claim 16 wherein the metallic layer is aluminum.

* * * * *